April 23, 1963 C. R. CULP 3,086,248
PROCESS FOR REDUCING AGING PERIOD OF CELLULAR
PRODUCTS FORMED WITH STEAM
Filed Dec. 7, 1959
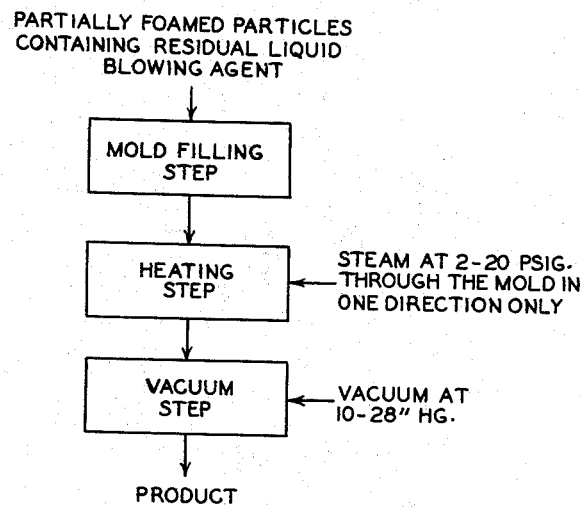
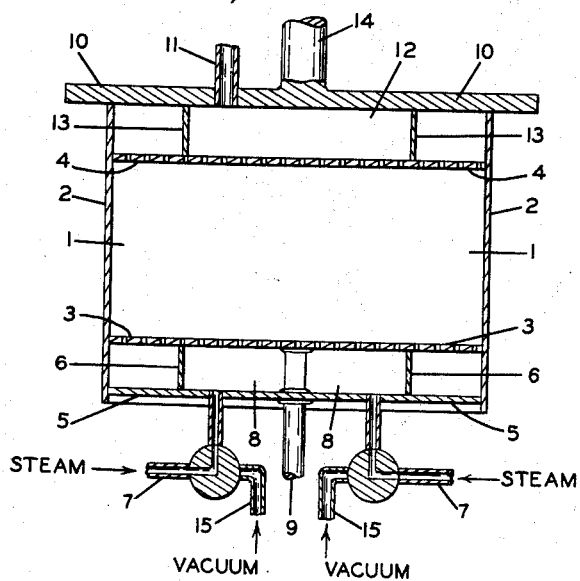
INVENTOR
CHARLES R. CULP
ATTORNEY

United States Patent Office 3,086,248
Patented Apr. 23, 1963

3,086,248
PROCESS FOR REDUCING AGING PERIOD OF CELLULAR PRODUCTS FORMED WITH STEAM
Charles R. Culp, East Hempfield Township, Lancaster County, Pa., assignor to Armstrong Cork Company, Lancaster, Pa., a corporation of Pennsylvania
Filed Dec. 7, 1959, Ser. No. 857,803
5 Claims. (Cl. 18—48)

This invention relates generally to cellular products and more particularly to an improved process for forming cellular products from small particles of partially foamed synthetic thermoplastic resins. Still more particularly the invention relates to an improvement in the process of forming blocks of foamed synthetic thermoplastic resins by eliminating the need for an aging period for such products.

The invention contemplates charging a mold having a perforated top plate and a perforated bottom plate with small particles of a porous synthetic thermoplastic resin which have been partially but incompletely foamed by means of heat and which still contain liquids in which the thermoplastic resin is insoluble. These liquid blowing agents have boiling points lower than the softening point of the resins. Steam is then passed through one or the other of the perforated plates of the mold at a steam pressure in the range of about 2–20 pounds per square inch gage to fuse and complete the expansion of the partially foamed resin particles. Simultaneously with the introduction of steam through one perforated plate, preferably the bottom plate, a vacuum is drawn on the mold through the other perforated plate by means of a source of a vacuum. Steam and vacuum are applied for a period of about 30 seconds to about 3 minutes. At the end of this time the steam is cut off and a vacuum of 10–28 inches of mercury is maintained for a period of 5–15 minutes. At the end of that time the vacuum is broken, the product is discharged and is ready for any further shaping or cutting which may be necessary.

The synthetic thermoplastic resin may be any of those resins described in the prior art which are suitable for expansion by liquid expanding agents. As an example of these resins, there may be cited polystyrene, polyvinyl chloride, polyvinylidene chloride, polyacrylic esters, polymethacrylic esters, polyacrylonitrile, interpolymers of butadiene or other dienes and styrene or acrylonitrile.

The liquid blowing agents are those liquids which have a boiling point lower than the softening point of the particular resin used. Additionally the liquid blowing agents are generally insoluble in the synthetic thermoplastic resin. The liquid blowing agents may be distributed throughout the synthetic thermoplastic resin by soaking the resin particles in the liquid blowing agent for a suitable period of time either at room temperature or above. Pressure may be used if desired. Generally speaking these procedures will incorporate between 3% and 15% by weight of the liquid blowing agent into the resin-blowing agent mixture. An alternate means of incorporating the liquid blowing agent into the synthetic thermoplastic resin particles is to conduct the polymerization of the monomer into the polymer in the presence of the liquid blowing agent. Examples of the liquid blowing agent are petroleum ether, pentane, hexane, heptane, cyclopentane, cyclohexane, and cyclopentadiene or mixtures of the liquids. Generally the blowing agents are aliphatic or cycloaliphatic hydrocarbons having a boiling range from about 30° to about 70° C.

The particles containing the liquid blowing agent will generally have a diameter of from about 0.5–5 mm., and it is these particles which are to be partially foamed. The pre-expansion of the particles will be accomplished by means of heat, in any convenient manner, but preferably with steam, so that the partially foamed particles are suitable to produce very low density products on the order of 1.25 pounds per cubic foot. The partial expansion is carried out to produce particles having a bulk density in the range of about 1–4 pounds per cubic foot. By bulk density is meant the density in pounds per cubic foot of a mass of the partially expanded beads which are not adhered together to form a single unitary mass.

The partially foamed beads having the proper bulk density are then placed in a mold having a perforated top plate and a perforated bottom plate. The mold is charged with the partially foamed particles, and the cover is closed. The steam pressure at the steam inlet should be brought to the range of about 2–20 pounds per square inch gage.

In the usual process the steam will be on for a period of time varying from about 30 seconds to about 3 minutes depending on the pressure used and the exact bulk density of the partially foamed particles in the mold. Normally the steam is then turned off and the cellular product is allowed to cool in the mold. This cooling process normally runs for about 10–30 minutes depending somewhat on the mold structure and ambient conditions.

While the steam is on a vacuum is applied to the mold at the side opposite that from which the steam enters. The vaccum is preferably obtained from steam nozzles, but any vacuum source having sufficient capacity will suffice. During the period of 30 seconds to 3 minutes in which the steam is on, no appreciable vacuum will exist in the mold. However, once the incompletely foamed particles in the mold have expanded to fill the mold and have fused together to form a coherent mass, and the steam is turned off, the interior of the mold will be subject to a definite vacuum. The vacuum should be maintained at the level of 10–25 inches of mercury and should be maintained for a period of 5–15 minutes. Shorter times will be required at higher vacuums.

Normally a block prepared in the absence of the vacuum technic requires a lengthy conditioning period of 6–8 weeks. Drying of the block takes place during the conditioning period, and this drying is rendered unnecessary by the short vacuum treatment immediate following the formation of the block. Additionally, use of the vacuum during the actual admission of steam into the mold produces a block of a more uniform density than has heretofore been achieved.

In the accompanying drawing:

FIGURE 1 illustrates a simplified flow diagram of the process of the present invention; and FIGURE 2 illustrates in a vertical sectional view a simplified mold shown in cross section in which the process of the present invention may be carried out.

FIGURE 1 is self-explanatory. In FIGURE 2, the mold cavity 1 is bounded by the mold walls 2 and the bottom perforated plate 3 and the top perforated plate 4. The bottom sealing plate 5 supports the bottom perforated plate 3 by means of the supports 6. Steam inlets 7 in the bottom sealing plate 5 open into the manifold 8 from which the steam passes through the bottom perforated plate 3 into the mold cavity 1. The bottom sealing plate 5 and the bottom perforated plate 3 fit inside the mold walls 2 and are both connected to the ram 9 which is suitably powered to move the plates 3 and 5 in an upwardly direction to discharge the finished product from the mold when the process has been completed. The top sealing plate 10 carries one or more vacuum outlets 11. Vacuum outlets 11 open into the upper manifold 12 which lies between the upper sealing plate 10 and the upper perforated plate 4; supports 13 connect the plates 10 and 4. The top sealing plate 10 carries a ram 14 by means of which the plates 10 and 4 may be raised for the filling of the mold with the partially foamed particles and for discharge of the final product. The vacuum inlets 15 are adapted to pull vacuum alternately with the steam inlets 7.

The mold cavity 1 is charged with partially expanded beads and the upper sealing plate 10 and the upper perforated plate 4 are placed in position to close the mold. Steam is passed into steam inlets 7 to achieve a pressure of 2–20 pounds per square inch gage at the manifold 8. Alternatively, steam may be passed through the vacuum outlets 11 which, under such circumstances, serve as a steam inlet; this will occur when the steam is passed in a downwardly direction through the mold. Vacuum inlets 15 will supply the vacuum. Normally, vacuum is applied through the vacuum outlets 11 simultaneously with the application of steam through the steam inlets 7. After the steam has been on for the requisite time, the steam is cut off while the vacuum is maintained in order to produce a vacuum on the interior of the mold. The vacuum is maintained for the requisite period of time after which the vacuum is broken and the product removed.

Products made by the present process can be shaped into boards and blocks, and used as low-temperature insulation materials.

The following example illustrates the process:

*Example*

Into a mold cavity measuring 38½" x 37½" x 20" there was placed 20 pounds of partially expanded polystyrene having a bulk density of 2.7 pounds per cubic foot. The mold possessed perforated top and bottom plates. The lid was closed and steam was allowed to enter from the bottom at a flow rate of 12,000 pounds per hour for approximately 30 seconds while, simultaneously, a vacuum from a steam exhauster was applied to an outlet in the lid. The steam was then shut off. Vacuum was maintained at 19 inches of mercury for a period of 10 minutes after which the vacuum was broken and the product was removed.

The product was found to have a density of 1.25 pounds per cubic foot and to maintain its dimensional stability for the next two months. Additionally, the block had less variation in density than blocks made in the absence of vacuum. Blocks made in the absence of vacuum had to be aged at room temperature for six weeks before they became sufficiently dimensionally stable to shape into boards and planks suitable for use as insulation in refrigerated trucks.

I claim:

1. In the process for the production of cellular shaped articles of synthetic thermoplastic resins which comprises charging a mold having a perforated top and bottom plate with small particles of porous synthetic thermoplstic resin which have been partially but incompletely foamed by means of heat and which particles contain liquid blowing agents in which the thermoplastic resin is insoluble, said liquids having boiling points lower than the softening point of said resin, and passing steam through said perforated plates of said mold until a steam pressure in the range of about 2–20 pounds per square inch gage is achieved at the steam inlet of said mold and discharging said product from said mold, the improvement which comprises applying vacuum to said mold on the side opposite from that in which steam is admitted to said mold during the time steam is admitted to said mold, cutting off the steam, and immediately subjecting the product in said mold to vacuum in the range of 10–28 inches of mercury for a period of 5–15 minutes.

2. A process according to claim 1 wherein said synthetic thermoplastic resin comprises polystyrene.

3. A process according to claim 1 wherein said liquid comprises petroleum ether.

4. A process according to claim 1 wherein said vacuum applied after said steam is cut off is in the range of about 20 inches of mercury.

5. A process according to claim 1 wherein said vacuum applied subsequent to cutting off of said steam is applied for a period of about 10 minutes.

References Cited in the file of this patent
UNITED STATES PATENTS

| | | |
|---|---|---|
| 1,691,280 | Granville | Nov. 13, 1928 |
| 2,420,815 | Cooper et al. | May 20, 1947 |
| 2,907,072 | Jodell | Oct. 6, 1959 |